US009571722B2

(12) United States Patent
Deng et al.

(10) Patent No.: US 9,571,722 B2
(45) Date of Patent: Feb. 14, 2017

(54) VIEWFINDER UTILITY

(71) Applicant: Google Technology Holdings LLC, Mountain View, CA (US)

(72) Inventors: Xiu-Feng Deng, Beijing (CN); Li-Min Tian, Beijing (CN); Qiang Xu, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/771,198

(22) PCT Filed: Feb. 27, 2013

(86) PCT No.: PCT/CN2013/071954
§ 371 (c)(1),
(2) Date: Aug. 27, 2015

(87) PCT Pub. No.: WO2014/131168
PCT Pub. Date: Sep. 4, 2014

(65) Prior Publication Data
US 2016/0014330 A1 Jan. 14, 2016

(51) Int. Cl.
*H04N 5/225* (2006.01)
*H04N 5/232* (2006.01)
(Continued)

(52) U.S. Cl.
CPC ........ *H04N 5/23216* (2013.01); *G06F 3/0482* (2013.01); *G06F 3/0488* (2013.01); *G06F 3/04817* (2013.01); *H04N 5/23293* (2013.01)

(58) Field of Classification Search
CPC .................................................... G06F 1/1692
(Continued)

(56) References Cited

U.S. PATENT DOCUMENTS

2006/0072028 A1* 4/2006 Hong ................. H04N 5/23216
348/333.01
2006/0077266 A1* 4/2006 Nurmi ............... H04M 1/72563
348/239
(Continued)

FOREIGN PATENT DOCUMENTS

| CN | 101690143 A | 3/2010 |
| CN | 102098437 A | 6/2011 |
| CN | 102572260 A | 7/2012 |

OTHER PUBLICATIONS

EOS 6D Wi-Fi Function Instruction Manual (CANON KK) Nov. 19, 2012 (Nov. 19, 2012) pp. 2 to 86.
(Continued)

Primary Examiner — Twyler Haskins
Assistant Examiner — Dwight C Tejano
(74) Attorney, Agent, or Firm — Troutman Sanders LLP; James E. Schutz; Mark Lehi Jones

(57) ABSTRACT

Disclosed is a viewfinder utility. The viewfinder receives image information from a camera and displays it on a screen of the user's device. Also in the viewfinder's display are icons associated with applications that can accept image information from the camera. By selecting an icon, a user sends captured image information to the associated application. Because the initial user interaction is with the viewfinder rather than with the application itself, there is no confusion caused by disparate application user interfaces. The viewfinder can also prevent some "lost moments" because the viewfinder is ready to capture a fleeting image even before the application is fully up and running and ready to accept it. Finally, in some embodiments the user can concurrently select more than one icon and can thus send the same image information to more than one application.

13 Claims, 4 Drawing Sheets

(51) Int. Cl.
 *G06F 3/0488* (2013.01)
 *G06F 3/0481* (2013.01)
 *G06F 3/0482* (2013.01)

(58) Field of Classification Search
 USPC ..................................... 348/333.01–333.04
 See application file for complete search history.

(56) References Cited

U.S. PATENT DOCUMENTS

| | | | | |
|---|---|---|---|---|
| 2007/0097245 | A1* | 5/2007 | Battles | G06F 3/03547 |
| | | | | 348/333.01 |
| 2009/0303373 | A1* | 12/2009 | Yamada | H04N 5/23293 |
| | | | | 348/333.02 |
| 2009/0310010 | A1* | 12/2009 | Matsushima | G06F 9/445 |
| | | | | 348/333.01 |
| 2010/0016003 | A1* | 1/2010 | Shapiro | H04L 43/0811 |
| | | | | 455/466 |
| 2010/0020221 | A1 | 1/2010 | Tupman et al. | |
| 2011/0050975 | A1* | 3/2011 | Chung | G06F 1/1624 |
| | | | | 348/333.02 |
| 2011/0157017 | A1* | 6/2011 | Webb | A63F 13/06 |
| | | | | 345/158 |
| 2011/0227810 | A1 | 9/2011 | McKinney et al. | |
| 2011/0311199 | A1 | 12/2011 | Fay et al. | |
| 2013/0038636 | A1* | 2/2013 | Fujiwaka | G06F 1/1643 |
| | | | | 345/681 |
| 2013/0141624 | A1* | 6/2013 | Tomizawa | H04N 5/23293 |
| | | | | 348/333.02 |
| 2013/0222663 | A1* | 8/2013 | Rydenhag | H04N 5/23293 |
| | | | | 348/333.01 |
| 2013/0286269 | A1* | 10/2013 | Wood | H04N 5/772 |
| | | | | 348/333.01 |
| 2013/0314578 | A1* | 11/2013 | Imaizumi | A63F 13/10 |
| | | | | 348/333.02 |

OTHER PUBLICATIONS

PCT/CN2013/071954 International Search Report and Written Opinion, Mailed Sep. 4, 2014.

* cited by examiner

VIEWFINDER UTILITY

CROSS-REFERENCE TO RELATED PATENT APPLICATION

This application is a United States National Stage Application of, and claims the benefit pursuant to 35 U.S.C. §371 of International Patent Application Ser. No. PCT/CN2013/071954, filed on 27 Feb. 2013, entitled "A Viewfinder Utility," by Xiu-Feng Deng, Li-Min Tian, and Qiang Xu, the contents of which is incorporated by reference herein in its entirety.

TECHNICAL FIELD

The present disclosure is related generally to digital imaging and, more particularly, to applications that use image information.

BACKGROUND

Today, digital cameras are often no longer stand-alone devices but are, rather, features integrated into more general-purpose devices, such as laptop computers and smartphones. Users of these devices continue to use their on-board cameras to take photographs and videos, of course, but these users also run numerous applications and utilities that can accept as input images produced by the cameras. Generally speaking, each such application or utility presents its own user interface and its own special commands for working with images from the camera.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
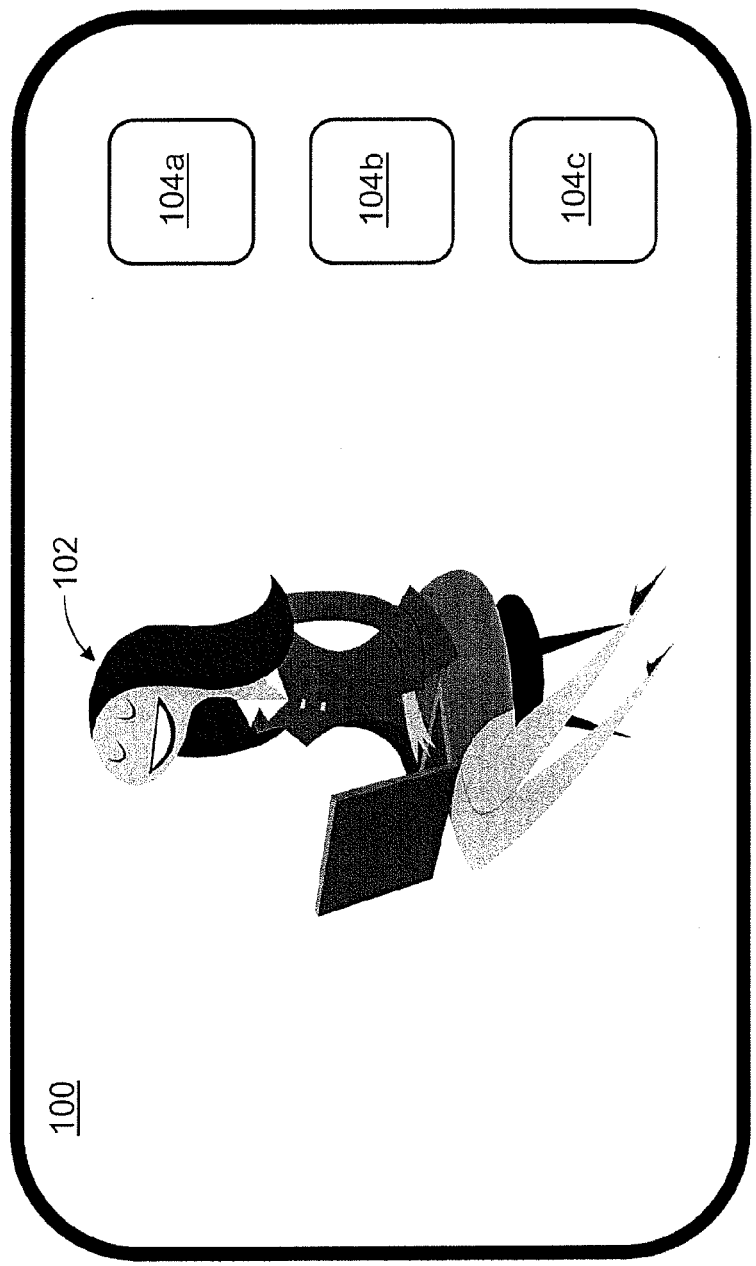
FIG. 1 is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Having multiple applications that can all use the device's camera presents several problems. A user may be confused by differences in the user interfaces when moving from one application to another. Also, when a user sees an image that he wishes to capture, it may take so long to select and bring up the correct application that the moment is lost before the application can capture an image from the camera. (This problem is well known to those who watch live sporting events.) Finally, if a user wishes to provide the same image to multiple applications, then he must deal with each application in turn, which can be very cumbersome.

The present disclosure presents a viewfinder utility. The viewfinder receives image information from a camera and displays it on a screen of the user's device. Also in the viewfinder's display are icons associated with applications that can accept image information from the camera. By selecting an icon, a user sends captured image information to the associated application. Because the initial user interaction is with the viewfinder rather than with the application itself, there is no confusion caused by disparate application user interfaces. The viewfinder can also prevent some "lost moments" because the viewfinder is ready to capture a fleeting image even before the application is fully up and running and ready to accept it. Finally, in some embodiments the user can concurrently select more than one icon and can thus send the same image information to more than one application.

Consider the electronics device 100 of FIG. 1. That device 100 could be just about anything that incorporates, or drives, a view screen. A viewfinder utility is running on the device 100. The device 100 also includes (or accepts image information from) a camera (not shown). The camera captures image information 102 and displays it within a window hosted by the viewfinder utility. Often, the image information 102 is live information captured in real-time by the camera.

Also shown in the viewfinder window are application icons 104*a*, 104*b*, and 104*c*. These can be displayed positioned over a portion of the image information 102 or can be displayed in a separate area of the viewfinder's window. As discussed in greater detail below with reference to FIG. 3, the user can select one or more of the icons 104*a-c* and thereby direct image information 102 captured by the camera to the applications associated with the selected icons 104*a-c*.

Figure 2:
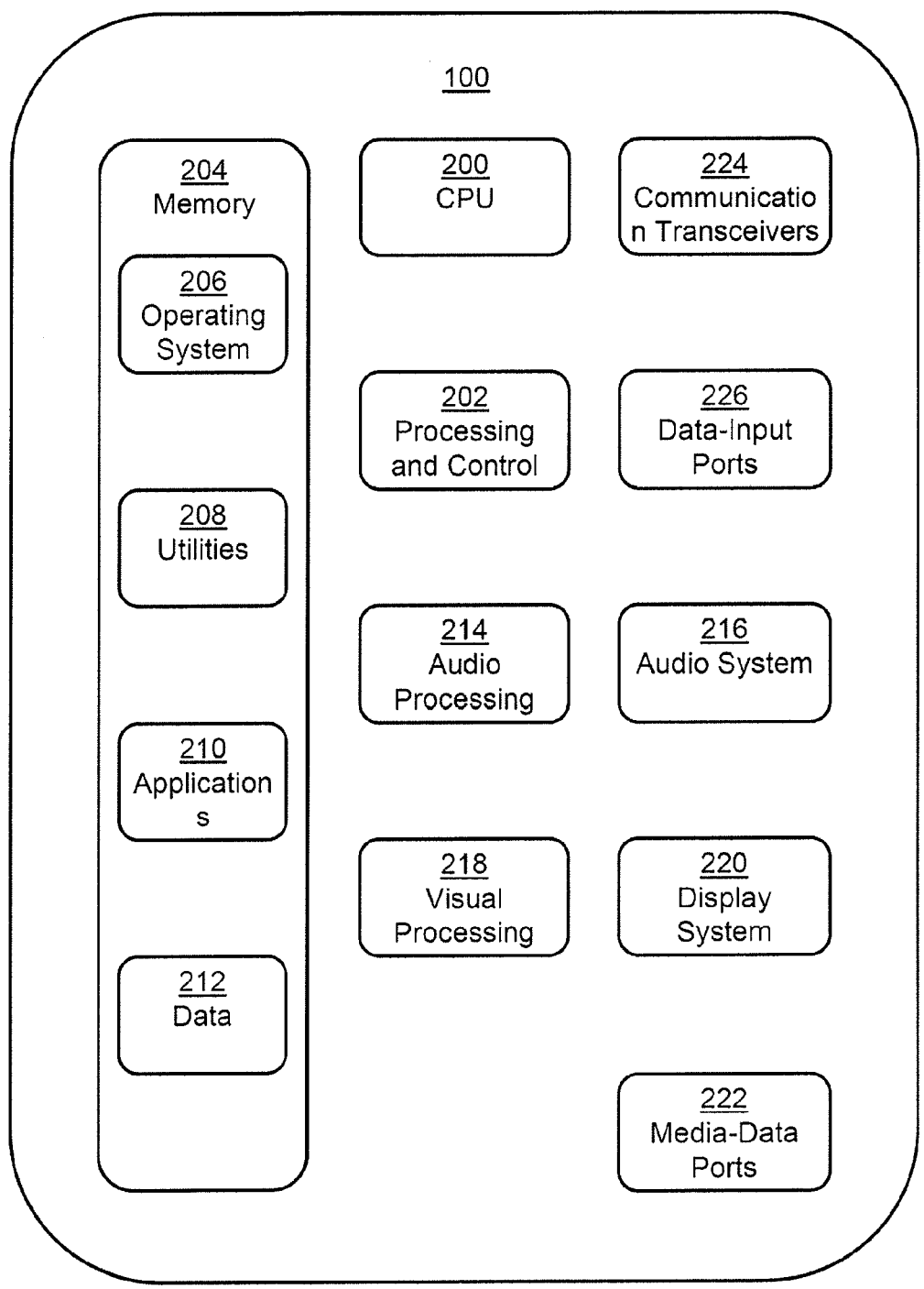
FIG. 2 is a generalized schematic of the electronics device of FIG. 1.

FIG. 2 shows the major components of a representative electronics device 100. The device 100 could be a personal electronics device (such as a smart phone, tablet, personal computer, electronic book, or camera), a set-top box or gaming console driving a television monitor and accepting input from a separate camera, or a compute server. It could even be a plurality of servers working together in a coordinated fashion.

Figure 3:
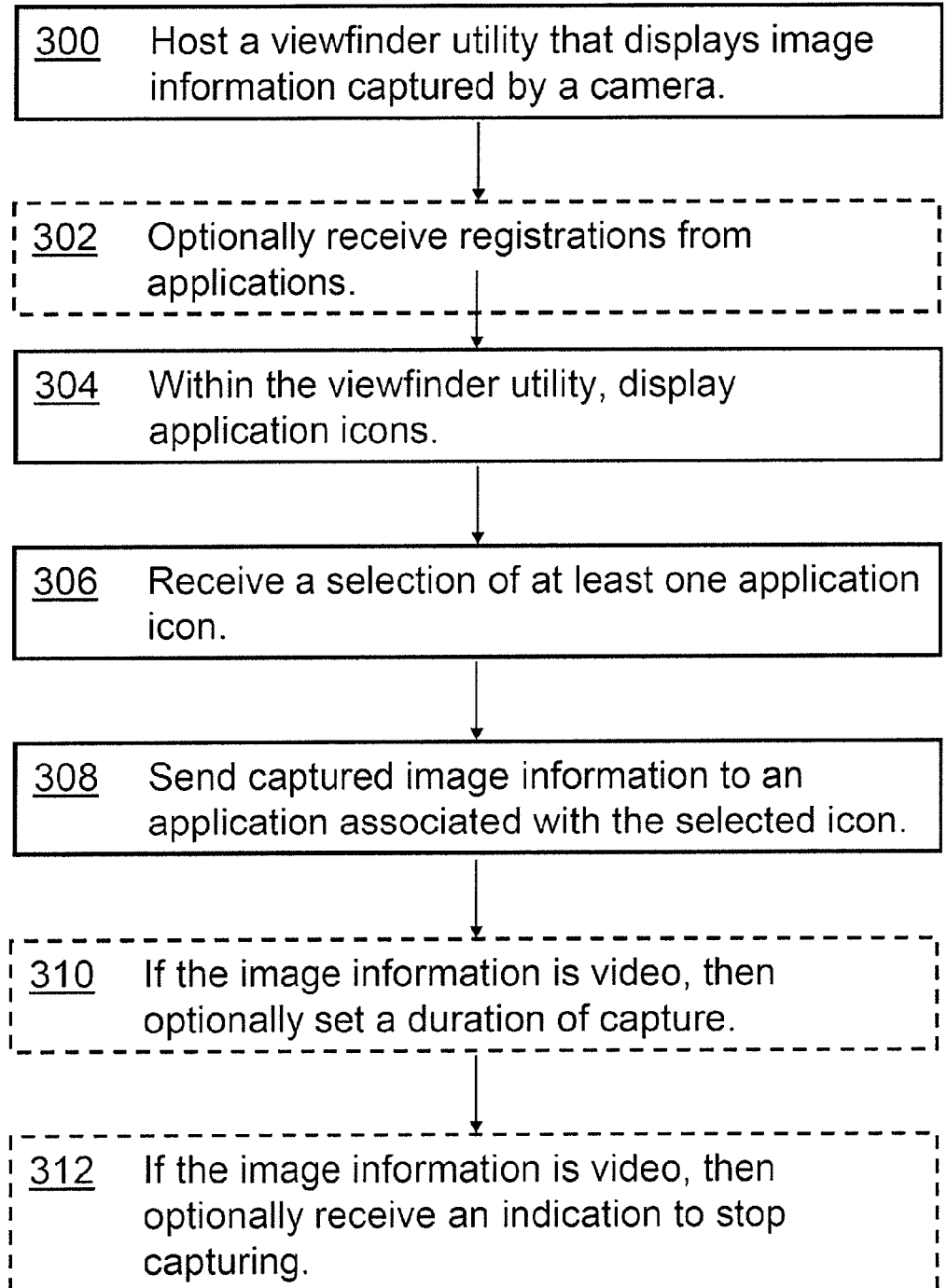
FIG. 3 is a flowchart of a representative method for a viewfinder utility.
Figure 4:
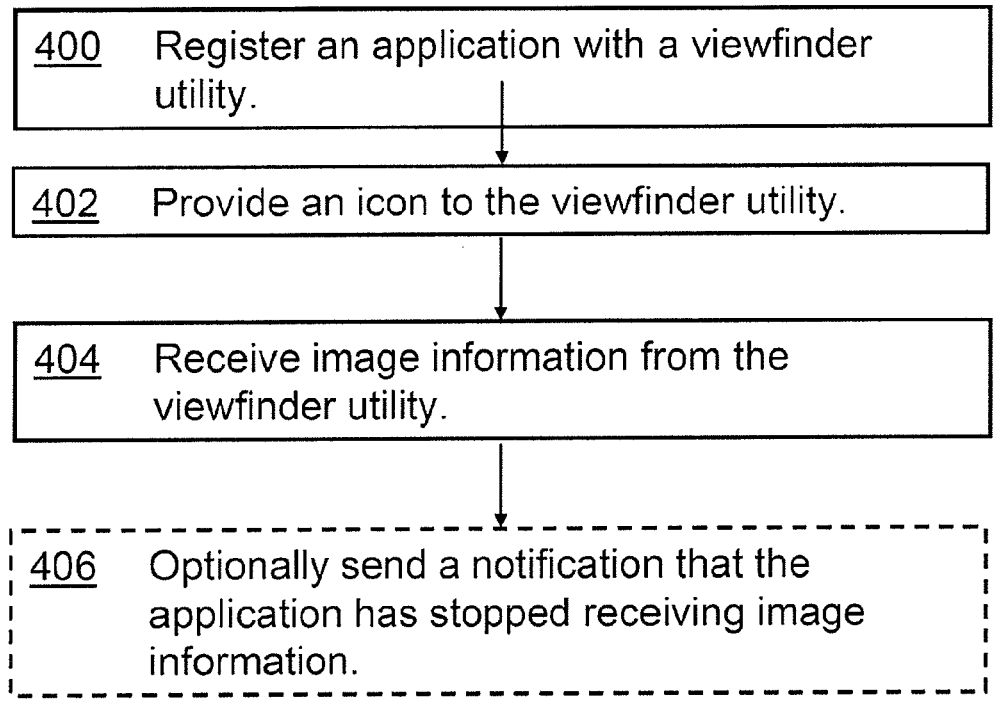
FIG. 4 is a flowchart of a representative method for an application to register with a viewfinder utility.

The CPU 200 of the electronics device 100 includes one or more processors (i.e., any of microprocessors, controllers, and the like) or a processor and memory system which processes computer-executable instructions to control the operation of the device 100. In particular, the CPU 200 supports aspects of the present disclosure as illustrated in FIGS. 3 and 4, discussed below. The device 100 can be implemented with a combination of software, hardware, firmware, and fixed-logic circuitry implemented in connection with processing and control circuits, generally identified at 202. Although not shown, the device 100 can include a system bus or data-transfer system that couples the various components within the device 100. A system bus can include any combination of different bus structures, such as a memory bus or memory controller, a peripheral bus, a universal serial bus, and a processor or local bus that utilizes any of a variety of bus architectures.

The electronics device 100 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device 100 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronics device 100, a hardware-abstraction layer for a particular component, and so on.

The electronics device 100 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 100. Alternatively (e.g., in a cellular telephone), these systems 216, 220 are integrated components of the device 100.

The electronics device 100 can include a communications interface which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios compliant with 3GPP standards, Wireless Metropolitan Area Network radios compliant with various IEEE 802.16 standards, and wired Local Area Network Ethernet transceivers.

The electronics device 100 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 100 to components, peripherals, or accessories such as microphones and cameras.

The method of FIG. 3 begins in step 300 where a viewfinder utility is hosted by the electronics device 100. As illustrated in FIG. 1, image information 102 captured by a camera is shown in a window hosted by the viewfinder utility. In some situations, the image information 102 is "live" information captured in real-time by the camera. In other situations, the image information 102 is not live. It could have been captured earlier by the camera (or by another camera), stored, and then retrieved to be displayed in the viewfinder utility's window. The image information 102 can be static or moving (i.e., a video).

In optional step 302, the viewfinder utility receives registrations from applications 210 that are configured to receive image information. In some embodiments (or for some applications 210), this registration is the work of the application 210 itself. In other embodiments (e.g., for prior art applications 210), the viewfinder utility, or an operating system 206 or another utility 208 of the device 100, gathers the registration information.

The viewfinder utility, in step 304, displays icons 104*a-c* for at least some applications 210 that are configured to receive image information. As is known, these icons 104*a-c* can be displayed over the image information 102 and can be made to be semi-transparent so that the underlying image information 102 can be seen through them. In some embodiments, these icons 104*a-c* are displayed in a portion of the viewfinder's display that does not show image information 102.

The user of the device 100 selects at least one icon 104*a-c* in step 306. Any known technique for selecting an icon 104*a-c* can be implemented here.

In step 308, captured image information is sent to each application 210 that corresponds to a selected icon 104*a-c*. The captured image information may be static, video, or even image metadata. The type of information sent may depend upon the selected application 210. For example, an image-storage application may accept any type of image information, while a bar-code or QR™ scanner may only need a static image.

In some situations, the camera begins to record image information when an icon 104*a-c* is selected in step 306, and that "real-time" image information is sent to the selected application 210 in step 308. In some situations, however, the transfer of captured image information to a selected application 210 need not be live. That is, an image can be captured and sent to an application 210 later. This allows the user to use the viewfinder utility to capture an image of an interesting event and decide later what to do with the captured image. In devices 100 where the selected application 210 may take a while to come up to speed after being selected, this feature can prevent losing an interesting image. The viewfinder can also be made to display previously captured image information. This ability can be important where the selected application 210 is hosted on a device remote from the device 100.

Many other applications 210 can accept image information, in addition to the examples mentioned just above, and each selected application 210 may impose its own requirements. For example, an e-mail or other messaging application can be selected to receive static or video image information. This application may present a menu or other user-interface element to allow the user of the device 100 to select the intended recipients for the captured image information.

A social-networking application can be selected and can be configured to automatically post the captured image information sent to it to a pre-defined account. In some embodiments, the social-networking application knows to accept a compressed image, possibly associated with metadata giving a geographical location of the device 100 when the image was captured. A text-recognition program may scan the captured image information for text and then present that text in an easily readable form to the user. An image-recognition program could look for faces in the image information, match those faces to contact information, if possible, and present the matches to the user. A search application may use the image information to develop a search query As a final example, a mapping program could use the image information to try to determine where the user is (or was, if the captured image information is not live).

As some of the above examples illustrate, the captured image information may need to be configured to make it most useful for a particular application 210. In some cases that configuration may be done post-capture by the application 210 itself. In other situations, it is preferable to configure the camera itself (or dedicated image-processing hardware) to optimize the image information captured.

As one straightforward example of configuring the captured image information, in optional step 310 the captured information is video of a specified duration.

Alternatively, in step 312, the viewfinder utility continues to capture video information and to send it to the selected application 210 until the viewfinder utility receives an indication to stop sending the video. For example, a second selection of a selected icon 104a-c may be an indication to stop the capture. Some embodiments of the device 100 (e.g., a camera) may have a dedicated button for stopping the capture. The selected application 210 may itself determine that it has enough image information and may tell the viewfinder utility to stop sending captured information.

Note that some of the above examples illustrate that the image information displayed by the viewfinder utility need not be the same as the image information actually sent to a selected application 210.

FIG. 4 presents a method usable by an application 210 to work with the viewfinder utility. Note that this method is not required, and that prior art applications 210 can be used with the viewfinder.

In step 400, the application 210 declares its ability to accept captured video information by registering with the viewfinder utility. The application 210 provides, in step 402, an icon 104a-c for the viewfinder to show in its display.

When an icon 104a-c is selected, the corresponding application 210 begins to receive captured image information in step 404. As noted above, the transfer of image information need not be live, and the captured image information may be altered in some way before it is received by the application 210.

Some applications 210, in optional step 406, tell the viewfinder utility that they do not need any more image information. A bar-code scanner may, for example, keep receiving image information until it can successfully read a bar code, or a face-recognition program can continue to receive image information and thereby refine its recognition. When the application is satisfied, it tells the viewfinder to stop.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for providing captured image information to an application, the method hosted by an electronics device comprising a camera, the method comprising:
    hosting, by the electronics device, a viewfinder utility, the viewfinder utility displaying first image information captured by the camera;
    displaying, by the viewfinder utility hosted by the electronics device, a plurality of application icons
    receiving, by the viewfinder utility hosted by the electronics device, a selection of a displayed application icon; and
    sending, by the electronics device, second image information captured by the camera to an application associated with the selected icon wherein sending the second image information comprises configuring the second image information, wherein the second image information comprises video information, and wherein configuring the second image information comprises setting a duration of capture of the second image information.

2. The method of claim 1 wherein the viewfinder utility displays in real time the first image information captured by the camera.

3. The method of claim 1 wherein the plurality of application icons are displayed over the first captured image information.

4. The method of claim 1 wherein the second image information sent to the application comprises an element selected from the group consisting of: static image information, and metadata.

5. The method of claim 1 wherein the application is selected from the group consisting of: a contacts application, e-mail, a messaging application, a social-networking application, a web-browser application, a storage application, a barcode scanner, a QR(TM) code scanner, a search engine, a mapping program, and a text-recognition program.

6. The method of claim 1 wherein configuring the second image information comprises configuring an operation of the camera.

7. The method of claim 1,
    further comprising:
        receiving an element selected from the group consisting of: a second selection of the selected icon, a selection of another icon, a button press, a timer notification, and a notification from the application associated with the selected icon; and
        based, at least in part, on the received element, stopping the sending of second image information to the application associated with the selected icon.

8. An electronics device configured for providing captured image information to an application, the electronics device comprising:
    a camera configured for capturing image information; and
    a processor operatively connected to the camera and configured for:
        hosting a viewfinder utility, the viewfinder utility displaying first image information captured by the camera;
        displaying, via the viewfinder utility, a plurality of application icons;
        receiving, by the viewfinder utility, a selection of a displayed application icon; and
        sending second image information captured by the camera to an application associated with the selected icon wherein sending the second image information comprises configuring the second image information wherein the second image information comprises video information, and wherein configuring the second image information comprises setting a duration of capture of the second image information.

9. The electronics device of claim 8 wherein the electronics device is selected from the group consisting of: a mobile telephone, a personal digital assistant, a computer, a tablet computer, an electronic book, a camera, a set-top box with a camera and a monitor, and a gaming console with a camera and a monitor.

10. A method for an application to receive captured image information, the method hosted by an electronics device comprising a camera, the method comprising:

registering, with a viewfinder utility on the electronics device, the application;

providing, to the viewfinder utility, an icon to be displayed by the viewfinder utility;

receiving second image information captured by the camera; and sending, by the electronics device, second image information captured by the camera to an application associated with the selected icon wherein sending the second image information comprises configuring the second image information, wherein the second image information comprises video information, and wherein configuring the second image information comprises setting a duration of capture of the second image information.

11. The method of claim 10 wherein the application is selected from the group consisting of: a contacts application, e-mail, a messaging application, a social-networking application, a web-browser application, a storage application, a barcode scanner, a QR(TM) code scanner, a search engine, a mapping program, and a text-recognition program.

12. The method of claim 10 wherein the second image information received by the application comprises an element selected from the group consisting of: static image information, video information, and metadata.

13. The method of claim 10 further comprising:

sending a notification that the application has stopped receiving second image information.

* * * * *